(12) United States Patent
Peterson et al.

(10) Patent No.: US 9,875,750 B2
(45) Date of Patent: Jan. 23, 2018

(54) DIGITAL VOLUME CONTROL

(71) Applicant: Cirrus Logic International Semiconductor Ltd., Edinburgh (GB)

(72) Inventors: Cory Jay Peterson, Austin, TX (US); Dylan Alexander Hester, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/192,258

(22) Filed: Jun. 24, 2016

(65) Prior Publication Data

US 2017/0372717 A1    Dec. 28, 2017

(51) Int. Cl.
| H04R 3/00 | (2006.01) |
| G10L 19/16 | (2013.01) |
| G06F 3/16 | (2006.01) |

(52) U.S. Cl.
CPC ............ *G10L 19/167* (2013.01); *G06F 3/165* (2013.01)

(58) Field of Classification Search
CPC ......... G06F 3/165; H04R 25/505; H04R 3/00; G10L 19/00; G10L 19/167
See application file for complete search history.

(56) References Cited

U.S. PATENT DOCUMENTS

| 5,226,000 A | 7/1993 | Moses et al. |
| 5,929,795 A * | 7/1999 | Wang ...................... G06F 7/544 341/118 |
| 6,281,824 B1 | 8/2001 | Masuda |
| 6,803,869 B1 | 10/2004 | Melanson et al. |
| 2006/0038919 A1* | 2/2006 | Barnhill ................ G10L 19/008 348/484 |
| 2006/0161964 A1* | 7/2006 | Chung ................... H04N 5/775 348/552 |
| 2008/0225181 A1* | 9/2008 | Kamada .............. H04M 1/0245 348/726 |
| 2012/0328213 A1* | 12/2012 | Yamamoto ............ G06T 3/4053 382/300 |

* cited by examiner

*Primary Examiner* — Thang Tran
(74) *Attorney, Agent, or Firm* — Norton Rose Fulbright US LLP

(57) ABSTRACT

A digital volume control may be implemented in a digital-to-analog controller (DAC) when an output rate of the DAC is higher than the input rate. The upsampling conversion process from the digital input to analog output may be controlled to adjust a volume of an output signal produced from the digital signals. The frames produced by the upsampling conversion process may include a fraction of scheduling blocks filled with the input data bit, where the fraction is based on a desired volume. The generated frames are provided to a finite impulse response (FIR) filter that produces an analog signal with a magnitude proportional to the determined fraction of scheduling blocks.

22 Claims, 8 Drawing Sheets

DIGITAL VOLUME CONTROL

FIELD OF THE DISCLOSURE

The instant disclosure relates to digital audio devices. More specifically, portions of this disclosure relate to volume control.

BACKGROUND

Today, most information is stored and transmitted digitally. Thus, audio files being played back by a user are generally digitally-encoded audio information. Audio files are generally converted from digital to analog signals and then played back through a speaker. A key component of a circuit for reproducing audio information as sounds for a user is thus a digital-to-analog converter (DAC). Conventionally, audio information is converted to common analog signals regardless of the stored format of the audio information, and the analog signals are manipulated and/or mixed with other sources and amplified to produce an output for a speaker. A volume level of the output may be adjusted by manipulating the analog signals before output to the speaker. However, there is a desire to not allow control over the analog processing performed within the digital-to-analog converter (DAC) or between the DAC and the speaker. Further, preservation of the quality, and sometimes high fidelity, of the digital audio data requires reducing the amount of processing performed on the digital data itself.

Shortcomings mentioned here are only representative and are included simply to highlight that a need exists for improved electrical components, particularly for audio processing employed in consumer-level devices, such as mobile phones. Embodiments described herein address certain shortcomings but not necessarily each and every one described here or known in the art.

SUMMARY

A digital volume control may be implemented in a digital-to-analog controller (DAC). In some embodiments, the DAC may provide digital volume control by manipulating the sample conversion process from the digital input to analog output. For example, a DAC may have an output data rate for the output analog signal that is higher than an input data rate for the input digital signal. An upsampler within the DAC may upconvert the lower input rate to the higher output rate, and that upsampler may be controlled to adjust an output volume produced from the digital signals. The DAC may manipulate the upsampled output to contain a percentage of content based on the input data based on a desired output volume level. For example, when upconverting by a factor of eight, a full volume upconversion may copy an input data bit eight times, but a half volume upconversion may copy an input data bit four times. When the manipulated and upconverted digital signal is output to a filter for producing an analog output, the magnitude of the filter output will be proportional to the number of times the input data bit was copied in the upconversion. This manipulation of the upconversion process may provide a digital volume control without altering the digital content itself, which reduces or eliminates concerns with maintaining the fidelity of the digital audio.

During upconversion, each input digital bit is converted to a frame, wherein that frame has a number of bits proportional to the upconversion ratio. In the above example, an eight-fold upconversion results in each input digital bit being used to form a frame with eight schedule blocks. In a conventional upsampler, the input digital bit would be used to fill all eight schedule blocks. As described above, the amount of schedule blocks in the frame to be filled with the input digital bit may be determined based on a desired output volume to provide digital volume control. When less then all of the schedule blocks are used for the digital input bit (e.g., when the volume is less than maximum), the schedule blocks not used for the input digital bit of the digital signal may be filled with a standard pattern (e.g., an alternating pattern of zero bits and one bits) or used to carry non-signal data. That non-signal data may be used by components between the DAC and the speaker to provide further control over the reproduction of the audio signals in the digital input data. In one embodiment, such non-signal data may be used for offset control in an amplifier that receives the analog output of the DAC.

According to one embodiment, a method may include receiving, at an audio component such as a digital-to-analog converter (DAC), a one-bit wide data stream, such as digital audio data. Along with the data stream, an indication may be received of a desired magnitude for an output generated from the one-bit wide data stream. For example, a volume level may be indicated along with the digital audio data being converted to analog signals for output to a speaker. The digital-to-analog conversion may include upsampling the one-bit wide data stream by a factor of N to form a frame with N schedule blocks corresponding to one bit of the received one-bit data stream. The converter may determine a number M of the N schedule blocks to fill with the one bit of the received one-bit wide data stream based on the received indication of the desired magnitude for the output. Then, the converter may fill the determined number M of the N schedule blocks of the frame with the one bit of the received one-bit data stream. A portion or all of the remaining N-M schedule blocks may be filled with an alternating pattern of zero bits and one bits and/or non-signal bits unrelated to the received one-bit wide data stream. Some of these non-signal bits may provide offset control for the converter. The converted frame may be output from the converter to an output path for reproducing content of the one-bit wide data stream at the desired magnitude. In certain embodiments, the one-bit wide data stream may be a pulse-density modulation (PDM)-modulated audio stream According to another embodiment, an apparatus may include an integrated circuit (IC) configured to perform steps including receiving a one-bit wide data stream; receiving an indication of a desired magnitude for an output generated from the one-bit wide data stream; upsampling the one-bit wide data stream by a factor of N to form a frame with N schedule blocks comprising one bit of the received one-bit data stream; determining a number of the schedule blocks to fill with the one bit of the received one-bit wide data stream based on the received indication of the desired magnitude for the output; and/or filling the determined number of the schedule blocks of the frame with the one bit of the received one-bit data stream.

According to another embodiment, an audio controller may include an input node configured to receive a one-bit wide audio data stream comprising digital data representing sounds and an output node configured to output an analog signal for reproducing the sounds by a transducer. The audio controller may also include a digital-to-analog converter (DAC) coupled to the input node and the output node and configured to convert the digital data of the one-bit wide audio data stream to the analog signal at the output node. The digital-to-analog converter (DAC) may include an upsampler configured to upsample the one-bit wide audio data stream by a factor of N to form a frame with N schedule blocks comprising one bit of the received one-bit wide audio data stream; volume control circuitry coupled to the upsampler and configured to determine a number of the schedule blocks to fill with the one bit of the received one-bit data stream based on the received indication of the desired magnitude for the output and to fill the determined number of the schedule blocks of the frame with the one bit of the received one-bit data stream; and/or at least one digital finite impulse response (FIR) filter coupled to the volume control circuitry and configured to generate the analog signal from the filled frame.

In certain embodiments, the volume control circuitry may be configured to fill at least a portion of remaining schedule blocks of the frame with an alternating pattern of zero bits and one bits; the volume control circuitry may be configured to fill at least a portion of remaining schedule blocks of the frame with bits unrelated to the received one-bit wide data stream; the bits unrelated to the received one-bit wide data stream may include bits providing offset control for the digital-to-analog converter (DAC). In some embodiments, the audio controller may also include an amplifier coupled to the at least one digital finite impulse response (FIR) filter and configured to drive the transducer to reproduce the sounds in the received one-bit wide audio data stream, and/or the at least one digital finite impulse response (FIR) filter may include two filters operating in parallel from the frame.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
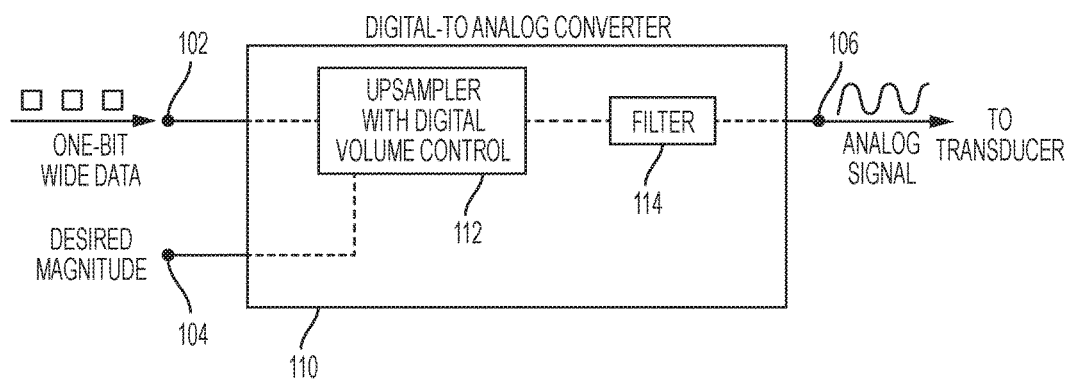
FIG. 1 is a block diagram illustrating an example digital-to-analog converter (DAC) with digital volume control according to one embodiment of the disclosure.

FIG. 1 is a block diagram illustrating an example digital-to-analog converter (DAC) with digital volume control according to one embodiment of the disclosure. A digital-to-analog converter (DAC) 110 may receive as input one-bit wide data at input node 102 and a desired magnitude at input node 104. When the DAC 110 is used to process audio data, the input node 102 may receive one-bit wide audio data such as pulse-density modulated (PDM) audio data or direct stream digital (DSD) audio data, and the input node 104 may receive an indication of a desired volume level at a headphone or speaker. The DAC 110 may output an analog signal at output node 106 that corresponds to the received digital data. For example, when the input digital data at input node 102 is digital audio data, the analog signal at the output node 106 may be a signal appropriate for output to a transducer. The output node 106 may not be connected directly to the transducer, but may be coupled to an output path (not shown) that drives the transducer using the analog signal at the output node 106. The analog signal at output node 106 may have an amplitude corresponding to a desired magnitude received at input node 104.

The DAC 110 may include several components for performing the conversion from digital signals to analog signals, including components not shown in FIG. 1. As described above, digital volume control may be implemented with the DAC 110 to provide volume control, in some embodiments, without exposing analog circuitry between the output node 106 and the transducer and without modifying the digital data received at input node 102. In the embodiment of FIG. 1 the digital volume control may be obtained when the DAC 110 receives input data at input node 102 at a lower rate than an output rate at the output node 106. An upsampler 112 may perform upsampling to increase the data rate of the received data at input node 102 and may also perform digital volume control as part of the upsampling process. The digital volume control of upsampler 112 may generate a digital output that, when applied to a filter 114, causes the output of the filter 114 to produce the desired magnitude that was received at input node 104 in the analog signal output at output node 106. The upsampler 112 may perform volume control by filling only a fraction of a frame with a data bit received at the input node 102.

In one embodiment of the DAC 110, the filter 114 may be a finite impulse response (FIR) filter that converts the digital output of upsampler 112 to an analog signal for output node 106 that may be applied to a speaker or headphone to reproduce sounds contained in the one-bit wide data stream. The FIR filter may be an analog FIR boxcar filter configured to perform part of the process of converting a digital signal to an analog waveform. In some embodiments, the FIR filter may include two banks of 256-tap analog FIR filters, in which each tap is a unit element current source. The two banks may be summed together to provide a net current representing the analog waveform. A current-to-voltage (I/V) converter, which may be a headphone amplifier, translates the net current into a voltage source, which represents an analog output for output to output node 106, and then to a headphone port of a mobile device. The taps of the FIR filter may be mapped to schedule blocks in a frame formed by the upsampler 112. Thus, by filling only a fraction of a frame with a data bit, only a fraction of the taps, or unit element current sources, may be activated. Control over the magnitude of the analog signal produced by the filter 114 is thus performed at the upsampler 112.

Figure 2:
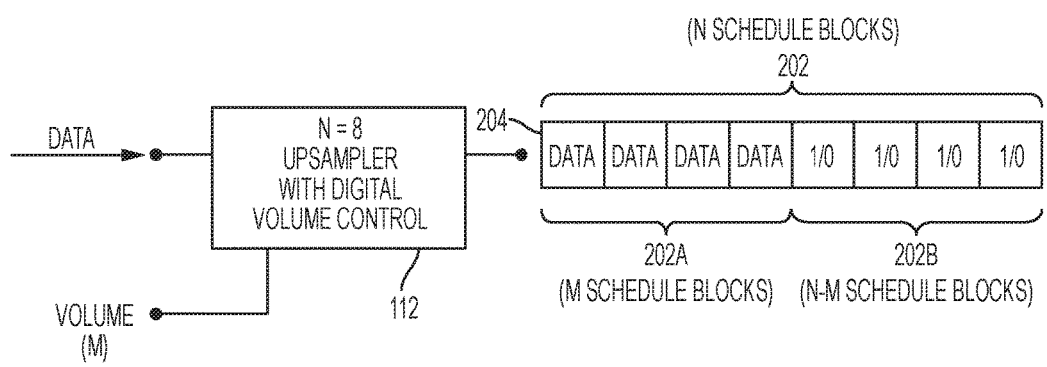
FIG. 2 is a block diagram illustrating an example input and output of a digital-to-analog converter (DAC) with digital volume control according to one embodiment of the disclosure.

The generation of frames by the upsampler 112 is described in more detail with reference to FIG. 2. FIG. 2 is a block diagram illustrating an example input and output of a digital-to-analog converter (DAC) with digital volume control according to one embodiment of the disclosure. The upsampler 112 may receive an input data bit DATA and a volume indication and generate a frame 204 for output to the filter 114 of FIG. 1. The frame 204 may have N number of schedule blocks 202, where N corresponds to the ratio of the output rate at output node 106 to the input rate at the input node 102. The example of FIG. 2 shows an N=8 upsampler, however the upsampler may be configured for any value of N, and may change configuration during operation of the DAC 110. The upsampler 112 may copy the input data bit DATA into a portion 202A of M schedule blocks of the frame 204. The M number of schedule blocks 202A containing the DATA bit may be selected based on the input volume level. The input volume level may be a signal used to determine the number M, or the input volume level may be a signal corresponding to the number M. After the DATA bit is inserted into the frame 204 in M number of schedule blocks 202A, a remaining number of schedule blocks 202B may be filled with ones and zeroes. In one embodiment, the remaining blocks 202B may be filled with an alternating pattern of zero bits and one bits, such as "1100" or "0011" or "1010" or "0101." Although FIG. 2 illustrates the generation of a single frame from a single input data bit, the ADC upsampler may receive a series of bits from a one-bit wide data stream, and each bit of the data stream may be used to generate a separate frame like the one shown in frame 204. One method of producing the frame 204 is described with reference to FIG. 3.

Figure 3:
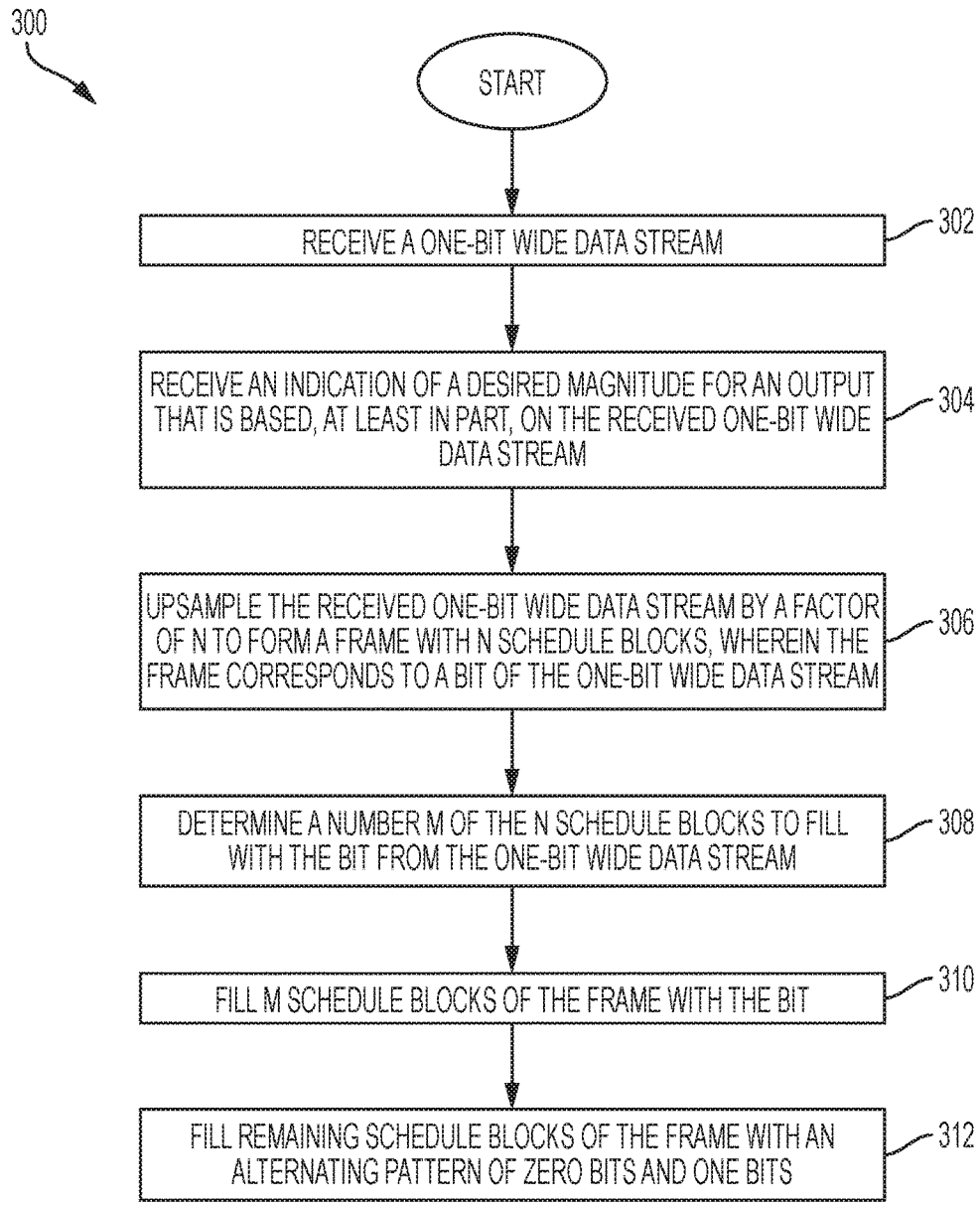
FIG. 3 is a flow chart illustrating an example method of digitally controlling volume in a digital-to-analog converter (DAC) according to one embodiment of the disclosure.

FIG. 3 is a flow chart illustrating an example method of digitally controlling volume in a digital-to-analog converter (DAC) according to one embodiment of the disclosure. A method 300 may include receiving a one-bit wide data stream at block 302 and receiving an indication of a desired magnitude at block 304. At block 306, the received one-bit wide data stream of block 302 may be upsampled by a factor of N to form a frame with N schedule blocks. At block 308, a number M may be determined to fill a portion of the N schedule blocks of the frame with a bit from the received one-bit wide data stream. At block 310, the determined M number of schedule blocks of the N schedule blocks in a frame may be filled with the bit from the received one-bit wide data stream. At block 312, the remaining N-M schedule blocks may be filled with an alternating pattern of zero bits and one bits.

Figure 4A:
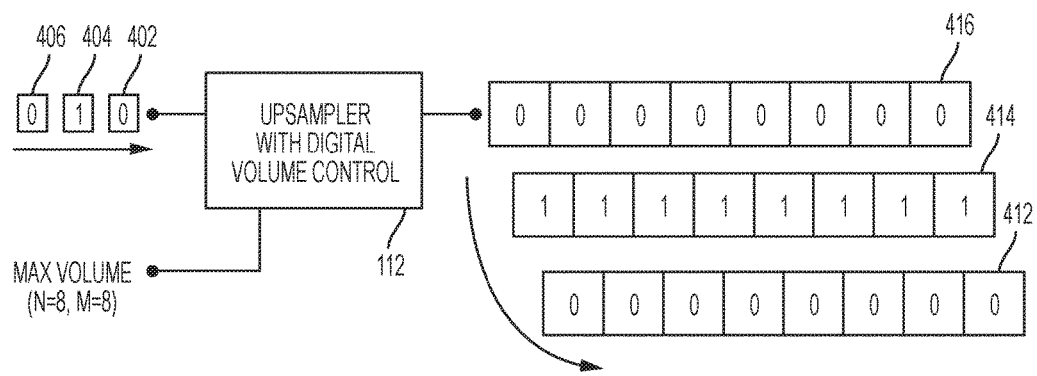
FIG. 4A is a block diagram illustrating an example input and output of a digital-to-analog converter (DAC) at maximum volume according to one embodiment of the disclosure.

An example of output frames generated by the upsampler 112 at a maximum volume level is shown in FIG. 4A. FIG. 4A is a block diagram illustrating an example input and output of a digital-to-analog converter (DAC) at maximum volume according to one embodiment of the disclosure. The upsampler 112 may receive bits 402, 404, and 406 as part of a one-bit wide data stream, along with an indication of a maximum volume level. As the bits 402, 404, and 406 are received, the upsampler 112 may generate frames 412, 414, and 416 corresponding to the bits 402, 404, and 406. Each of the frames 412, 414, and 416 have all schedule blocks filled with the input bits 402, 404, and 406, respectively, when the volume is at maximum. In some embodiments, the maximum volume may result in less than all schedule blocks in a frame being filled, as described in some examples below.

Figure 4B:
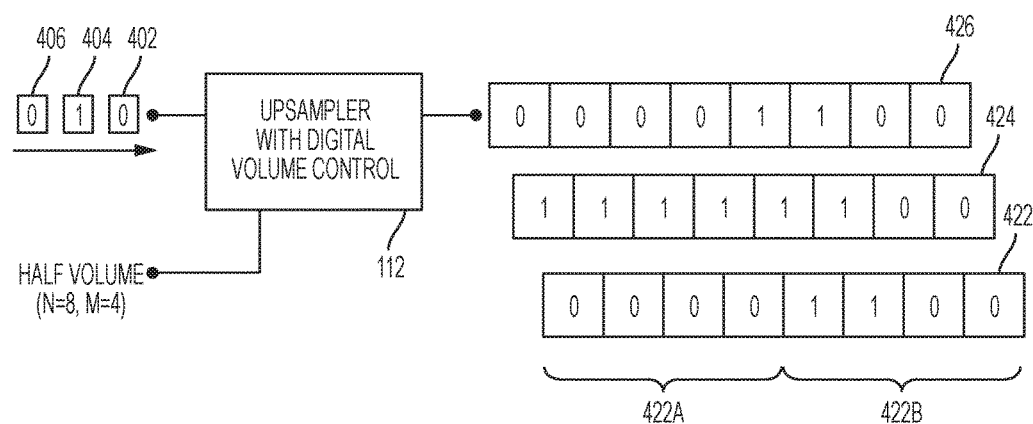
FIG. 4B is a block diagram illustrating an example input and output of a digital-to-analog converter (DAC) at half volume according to one embodiment of the disclosure.

An example of output frames generated by the upsampler 112 at half volume level is shown in FIG. 4B. FIG. 4B is a block diagram illustrating an example input and output of a digital-to-analog converter (DAC) at half volume according to one embodiment of the disclosure. The upsampler 112 may receive bits 402, 404, and 406 as part of a one-bit wide data stream, along with an indication of a half volume level. As the bits 402, 404, and 406 are received, the upsampler 112 may generate frames 422, 424, and 426 corresponding to the bits 402, 404, and 406. Each of the frames 422, 424, and 426 may have a first portion, such as four blocks, filled with the input bits 402, 404, and 406, respectively, with the volume at half level. For example, the upsampler 112 may determine, based on the received volume level indication, that M=4 and thus fill the first portion 422A of schedule blocks with the data bit 402 and insert an alternating pattern of zero bits and one bits in a second portion 422B of schedule blocks. The alternating pattern may add some noise to the analog signal at output node 106; however, the noise may be centered at the PDM data rate and thus be filtered out by the filter 114 of FIG. 1. Volume changes by increasing or decreasing the number M may result in the introduction of a temporary phase and amplitude glitch; however, the volume changes may be performed at zero crossings to reduce these glitches.

Figure 5:
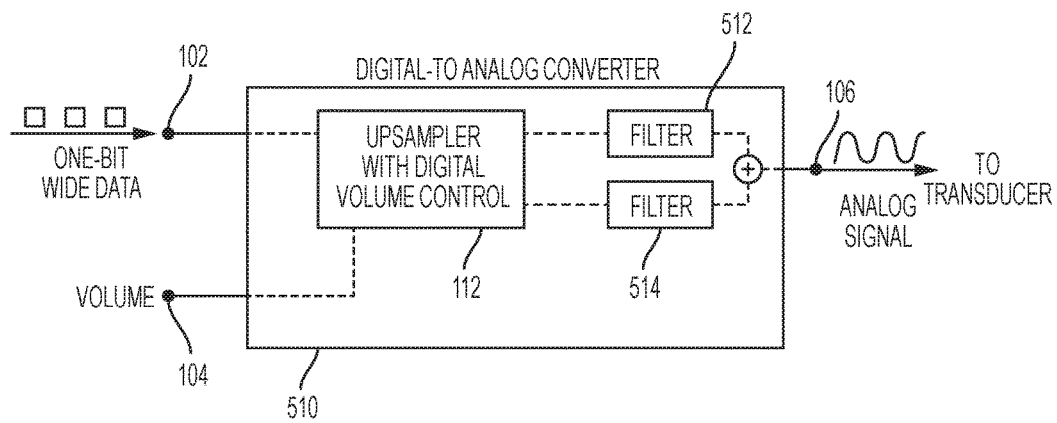
FIG. 5 is a block diagram illustrating an example digital-to-analog converter (DAC) with digital volume control and parallel filters according to one embodiment of the disclosure.

Referring back to FIG. 1, the DAC 110 is shown with a single filter 114. However, other configurations of filters are possible for generating the analog signal at output node 106. For example, two filters may be arranged in a parallel configuration as shown in FIG. 5. FIG. 5 is a block diagram illustrating an example digital-to-analog converter (DAC) with digital volume control and parallel filters according to one embodiment of the disclosure. The DAC 510 may include filters 512 and 514 configured in parallel. The outputs of the filters 512 and 514 may be summed for output to the output node 106. A parallel arrangement of filters, such as in DAC 510, may provide one manner of increasing the resolution of the volume. That is, if both filters 512 and 514 include 8-bit inputs, then the combination of filters 512 and 514 provide 16 possible volume levels, whereas a single filter alone would only provide 8 possible volume levels. The upsampler 112 may be configured to match the number of filters by generating frames for each of the filters 512 and 514. One example of generated frames by the upsampler 112 for two or more parallel filters is shown in FIG. 6.

Figure 6:
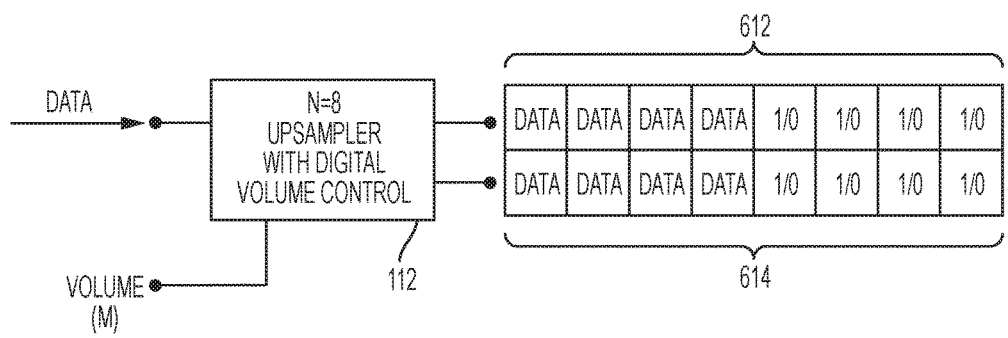
FIG. 6 is a block diagram illustrating an example input and output of a digital-to-analog converter (DAC) with digital volume control and parallel filters according to one embodiment of the disclosure.
Figure 7:
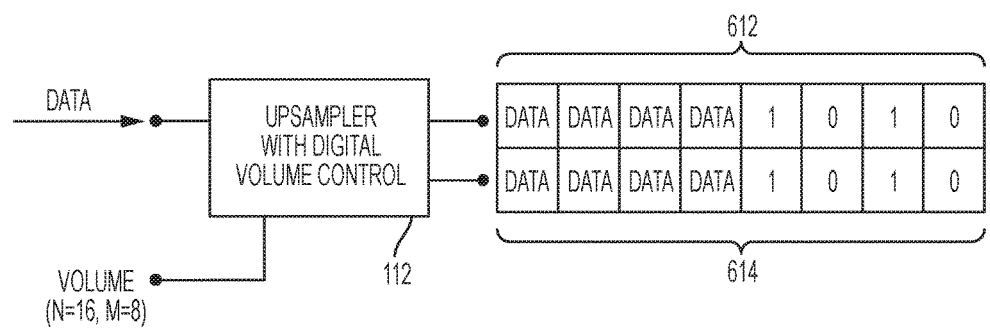
FIG. 7 is a block diagram illustrating an example input and output of a digital-to-analog converter (DAC) with parallel filters at half volume according to one embodiment of the disclosure.

FIG. 6 is a block diagram illustrating an example input and output of a digital-to-analog converter (DAC) with digital volume control and parallel filters according to one embodiment of the disclosure. The upsampler 112 may receive a data bit DATA and generate frames 612 and 614 for output to filters 512 and 514 of FIG. 5, respectively. A number of schedule blocks of each of the frames 612 and 614 may be determined based on an input volume level. One example output for frames 612 and 614 from upsampler 112 is shown in FIG. 7. FIG. 7 is a block diagram illustrating an example input and output of a digital-to-analog converter (DAC) with parallel filters at half volume according to one embodiment of the disclosure.

When the two or more filters are used in a DAC, each of the filters may receive the same frames, as shown in the example of FIG. 7, or some of the filters may receive different frames. The different frames may be formed based on a method similar to that described above with reference to FIG. 3, but the frames may be modified from the frame that would be generated by the example method of FIG. 3. For example, the frame generated after block 310 or 312 may be referred to as a filled frame, or a frame with at least some schedule blocks filled with the upsampled data bit in accordance with a desired output magnitude. That filled frame may be used as a basis for generating other frames that may be provided to some of the two or more filters. In one embodiment, different frames may be provided to the two filters to obtain an increase in resolution for the digital volume control. When an identical 8-bit frame is provided to each filter, a digital volume level may have 8 or less discrete volume levels. When different 8-bit frames are provided to each filter, a digital volume level may have an increased number of discrete volume levels, such as up to 16 volume levels when two filters are included. In another embodiment, different frames may be provided to the two or more filters to shape noise by alternating patterns to prevent FIR mismatch from showing up at the output.

When less then all of the schedule blocks are used for the digital input bit (e.g., when the volume is less than maximum), the schedule blocks not used for the input digital bit of the digital signal may be used to carry non-signal data. In some embodiments, some schedule blocks may be reserved for this non-signal data. For example, a maximum volume may be set when nearly all schedule blocks of the frame are filled. In a frame with eight schedule blocks, one schedule block may be reserved for non-signal data, such as by filling only seven of the eight schedule blocks when a maximum volume is set. That non-signal data may be used by components between the DAC and the speaker to provide further control over the reproduction of the audio signals in the digital input data. In one embodiment, such non-signal data may be used for offset control in an amplifier that receives the analog output of the DAC. The offset control may allow the output of the one-bit wide data stream to headphones or other speaker without a blocking capacitor.

Figure 8:
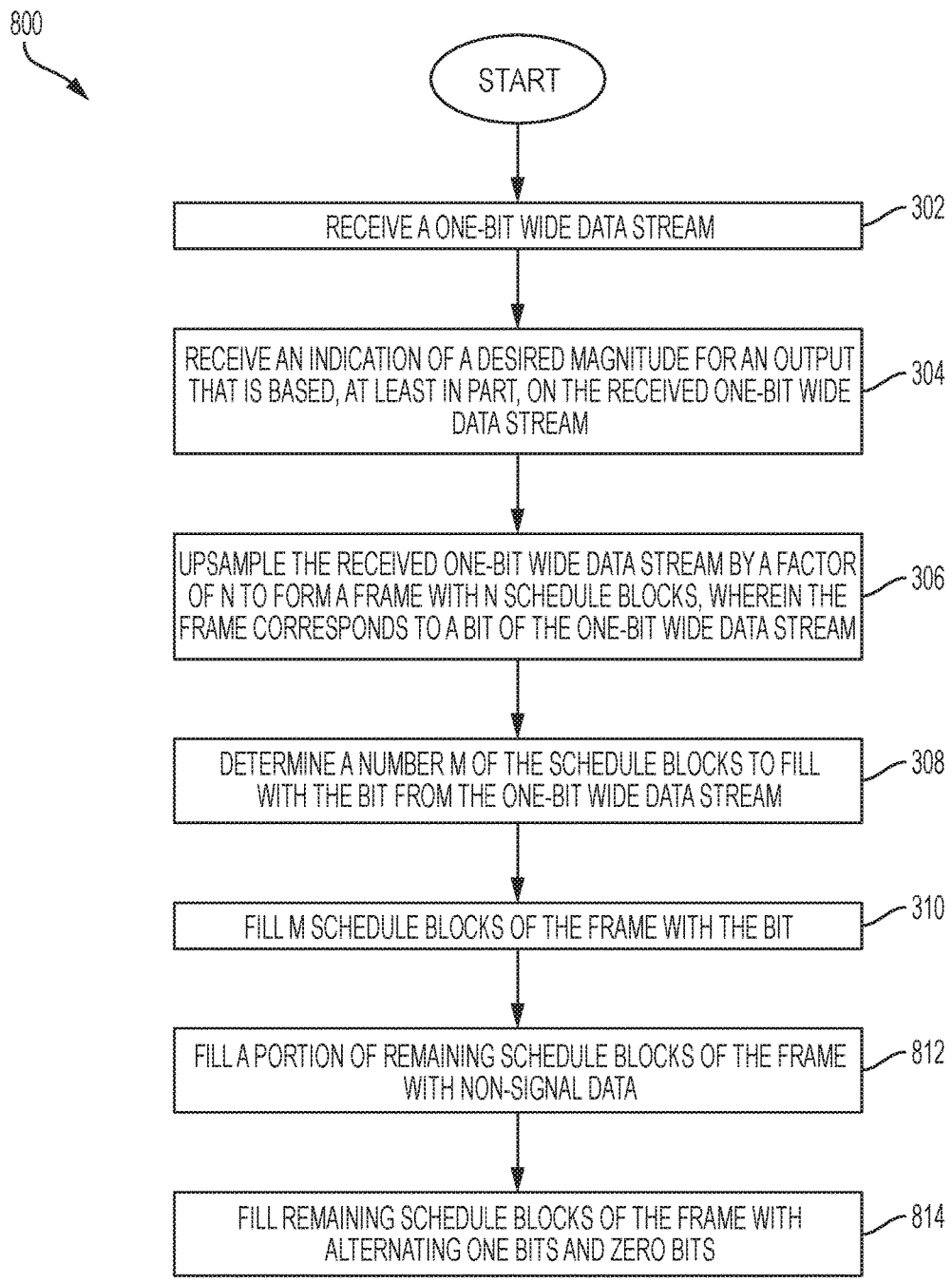
FIG. 8 is a flow chart illustrating an example method of digitally controlling volume and using remaining scheduling blocks in a frame for non-signal data according to one embodiment of the disclosure.

One example method of operation for digital volume control incorporating non-signal data by the upsampler is shown in FIG. 8. FIG. 8 is a flow chart illustrating an example method of digitally controlling volume and using remaining scheduling blocks in a frame for non-signal data according to one embodiment of the disclosure. A method 800 may include blocks 302, 304, 306, 308, and 310, similar to the method 300 of FIG. 3. After M schedule blocks of the frame are filled with the data bit at block 310, the remainder of the frame may be filled with other bits in blocks 812 and 814. At block 812, a portion of the remaining schedule blocks may be filled with non-signal data, such as data for offset control as described above. At block 814, the still remaining schedule blocks may be filled with an alternating pattern of zero bits and one bits. An example of a frame generated by an upsampler or other circuitry by performing the method 800 is shown in FIG. 9.

Figure 9:
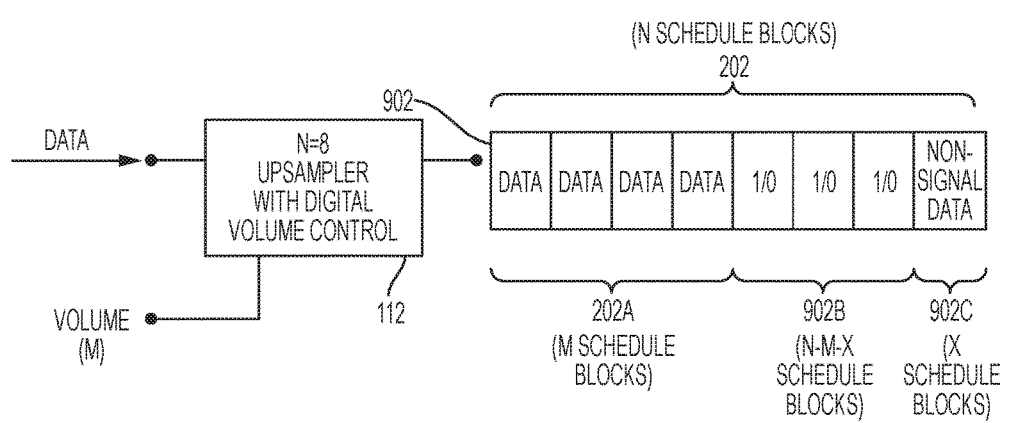
FIG. 9 is a block diagram illustrating an example input and output of a digital-to-analog converter (DAC) with digital volume control with non-signal data according to one embodiment of the disclosure.

FIG. 9 is a block diagram illustrating an example input and output of a digital-to-analog converter (DAC) with digital volume control with non-signal data according to one embodiment of the disclosure. The upsampler 112 may generate frame 902 with N schedule blocks 202 based on an input data bit DATA. The received volume level may be used to determine that an M number of schedule blocks 202A will be filled with the data bit DATA at block 308 of FIG. 8. The schedule blocks 202A are filled with data bit DATA at block 310 of FIG. 8. The frame 902 may also include schedule blocks 902C for non-signal data, which are filled at block 812 of FIG. 8. Block 812 may include filling a pre-determined number X schedule blocks 902C with non-signal data, such as offset data. Although one schedule block is shown reserved for non-signal data in frame 902, more schedule blocks may be reserved. Remaining schedule blocks 902B may be filled with an alternating pattern at block 814 of FIG. 8.

Figure 10:
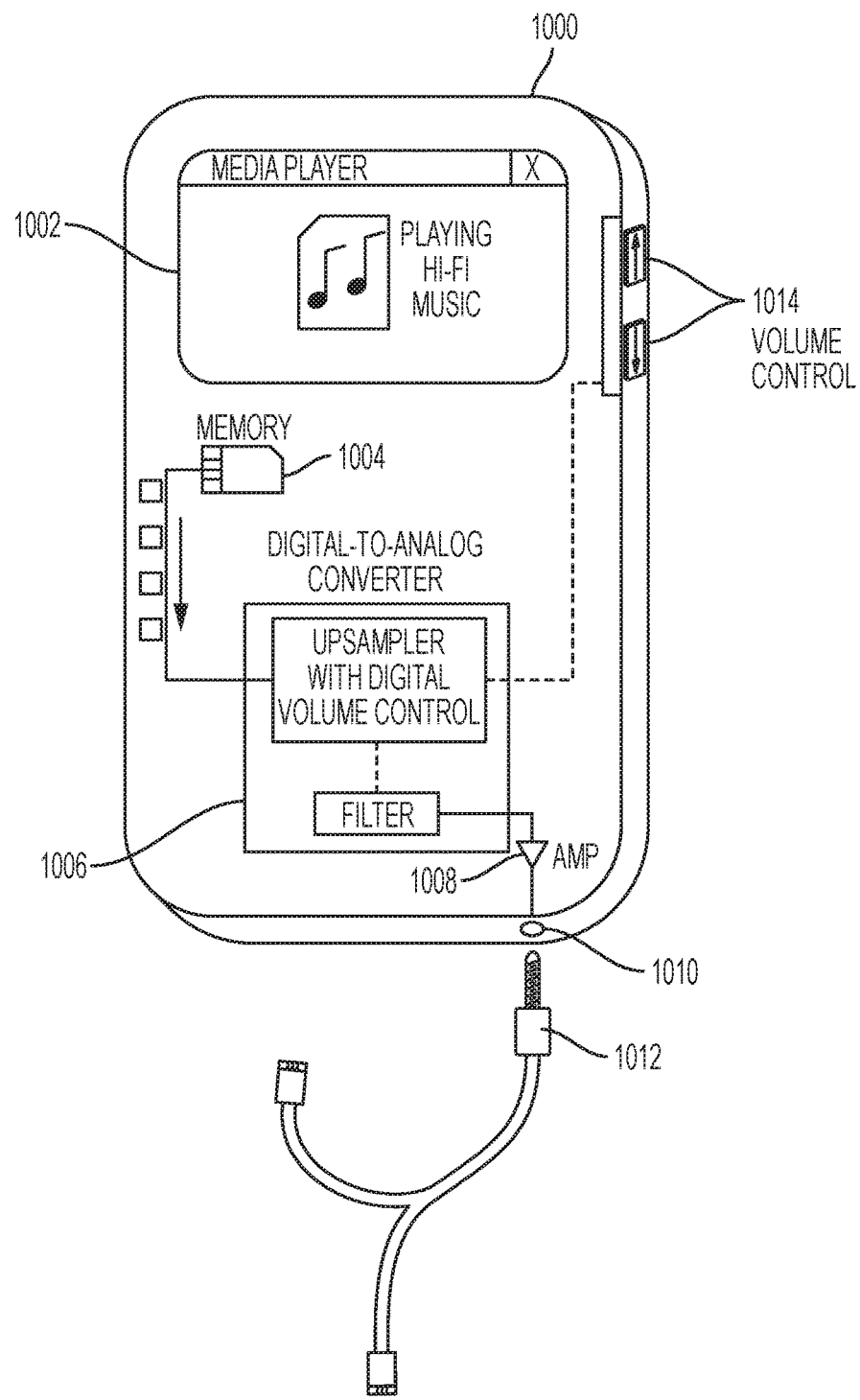
FIG. 10 is an illustration showing an example personal media device for playback of high-fidelity audio including an audio component that is configured to perform digital volume control according to one embodiment of the disclosure.

One advantageous embodiment for an audio processor, such as a digital-to-analog converter (DAC), with digital volume control is a personal media device for playing back high-fidelity music from one-bit wide digital data, such as DSD or PDM data. FIG. 10 is an illustration showing an example personal media device for playback of high-fidelity audio including an audio component that is configured to perform digital volume control according to one embodiment of the disclosure. A personal media device 1000 may include a display 1002 for allowing a user to select from music files for playback, which may include both high-fidelity music files and normal music files. When high-fidelity music files are selected by a user, audio files may be retrieved from memory 1004 by an application processor (not shown) and provided to a digital-to-analog converter (DAC) 1006. The DAC 1006 may include an upsampler with digital volume control, similar to those described in the embodiments of FIG. 1 or FIG. 5. The DAC 1006, or other circuitry in the device 1000, may perform methods similar to those described in the embodiments of FIG. 3 and FIG. 8 to produce the sample outputs illustrated in FIG. 2, FIG. 4A, FIG. 4B, FIG. 6, FIG. 7, and/or FIG. 9. The digital data retrieved from memory 1004 may be converted to analog signals by the DAC 1006, and those analog signals amplified by an amplifier 1008. The amplifier 1008 may be coupled to an audio output 1010, such as a headphone jack, for driving a transducer, such as headphones 1012. An indication of a desired magnitude for an output at the audio output 1010 to produce a desired volume level at the headphones 1012 may be provided to the DAC 1006 from volume control 1014, which may include a wheel, buttons, or other input devices that allow a user to indicate a volume level. Although the volume control 1014 is shown as physical buttons, the volume level may alternatively be controlled through software on the personal media device 1000. Although the data received at the DAC 1006 is described as being received from memory 1004, the one-bit wide data may also be received from other sources, such as a USB connection, a device connected through Wi-Fi to the personal media device 1000, a cellular radio, an Internet-based server, another wireless radio, and/or another wired connection.

The schematic flow chart diagrams of FIG. 3 and FIG. 8 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although analog-to-digital converters (ADCs) are described throughout the detailed description, aspects of the invention may be applied to the design of other converters, such as digital-to-analog converters (DACs) and digital-to-digital converters, or other circuitry and components based on delta-sigma modulation. Further, although ones (1s) and zeros (0s) or highs and lows are given as example bit values throughout the description, the function of ones and zeros may be reversed without change in operation of the processor described in embodiments above. As another example, although processing of audio data is described, other data may be processed through the filters and other circuitry described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a one-bit wide data stream;
   receiving an indication of a desired magnitude for an output generated from the one-bit wide data stream;
   upsampling the one-bit wide data stream to form a frame with schedule blocks comprising one bit of the received one-bit wide data stream;
   determining a number of the schedule blocks to fill with the one bit of the received one-bit wide data stream based on the received indication of the desired magnitude for the output; and
   filling the determined number of the schedule blocks of the frame with the one bit of the received one-bit data stream.

2. The method of claim 1, further comprising filling at least a portion of remaining schedule blocks of the frame with an alternating pattern of zero bits and one bits.

3. The method of claim 2, further comprising filling at least a portion of remaining schedule blocks of the frame with bits unrelated to the received one-bit wide data stream.

4. The method of claim 3, wherein the bits unrelated to the received one-bit wide data stream comprise bits providing offset control for a digital-to-analog converter (DAC).

5. The method of claim 1, wherein the step of receiving the one-bit wide data stream comprises receiving a pulse-density modulation (PDM)-modulated audio stream, and wherein the step of receiving the indication of the desired magnitude comprises receiving an indication of a desired volume for reproduction of the pulse-density modulation (PDM)-modulated audio stream.

6. The method of claim 1, further comprising providing the frame to an output path for reproducing content of the one-bit wide data stream at the desired magnitude.

7. The method of claim 6, wherein the step of providing the frame to the output path comprises providing the frame to at least one digital finite impulse response (FIR) filter configured to convert the one-bit wide data stream to an analog signal for the output path.

8. The method of claim 7, wherein the step of providing the frame to the at least one digital finite impulse response (FIR) filter comprises providing the frame to at least two digital finite impulse response (FIR) filters operating in parallel.

9. An apparatus, comprising:
   a memory configured to store one or more instructions; and
   an integrated circuit (IC) configured to execute the one or more instructions, and the one or more instructions, when executed by the integrated circuit, cause the integrated circuit to perform steps comprising:

receiving a one-bit wide data stream; receiving an indication of a desired magnitude for an output generated from the one-bit wide data stream;

upsampling the one-bit wide data stream to form a frame with N schedule blocks comprising one bit of the received one-bit wide data stream;

determining a number of the schedule blocks to fill with the one bit of the received one-bit wide data stream based on the received indication of the desired magnitude for the output; and filling the determined number of the schedule blocks of the frame with the one bit of the received one-bit data stream.

10. The apparatus of claim 9, wherein the integrated circuit is further configured to perform steps comprising filling at least a portion of remaining schedule blocks of the frame with an alternating pattern of zero bits and one bits.

11. The apparatus of claim 10, wherein the integrated circuit is further configured to perform steps comprising filling at least a portion of remaining schedule blocks of the frame with bits unrelated to the received one-bit wide data stream.

12. The apparatus of claim 11, wherein the bits unrelated to the received one-bit wide data stream comprise bits providing offset control for a digital-to-analog converter (DAC).

13. The apparatus of claim 9, wherein the integrated circuit is configured to perform the step of receiving the one-bit wide data stream by receiving a pulse-density modulation (PDM)-modulated audio stream, and the step of receiving the indication of the desired magnitude by receiving an indication of a desired volume for reproduction of the pulse-density modulation (PDM)-modulated audio stream.

14. The apparatus of claim 9, wherein the integrated circuit is further configured to perform steps comprising providing the frame to an output path for reproducing content of the one-bit wide data stream at the desired magnitude.

15. The apparatus of claim 14, wherein the integrated circuit is configured to perform the step of providing the frame to the output path by providing the frame to at least one digital finite impulse response (FIR) filter configured to convert the one-bit wide data stream to an analog signal for the output path.

16. The apparatus of claim 15, wherein the integrated circuit is configured to perform the step of providing the frame to the at least one digital finite impulse response (FIR) filter by providing a frame to each of the at least two digital finite impulse response (FIR) filters operating in parallel, wherein each of the provided frames to the digital finite impulse response (FIR) filters is based on the filled frame.

17. An audio controller, comprising:

an input node configured to receive a one-bit wide audio data stream comprising digital data representing sounds;

an output node configured to output an analog signal for reproducing the sounds by a transducer; and a digital-to-analog converter (DAC) coupled to the input node and the output node and configured to convert the digital data of the one-bit wide audio data stream to the analog signal at the output node, wherein the digital-to-analog converter (DAC) comprises:

an upsampler configured to upsample the one-bit wide audio data stream to form a frame with N schedule blocks comprising one bit of the received one-bit wide audio data stream;

volume control circuitry coupled to the upsampler and configured to determine a number of the schedule blocks to fill with the one bit of the received one-bit wide data stream based on the received indication of the desired magnitude for the output and to fill the determined number of the schedule blocks of the frame with the one bit of the received one-bit data stream; and at least one digital finite impulse response (FIR) filter coupled to the volume control circuitry and configured to generate the analog signal from the filled frame.

18. The audio controller of claim 17, wherein the volume control circuitry is further configured to fill at least a portion of remaining schedule blocks of the frame with an alternating pattern of zero bits and one bits.

19. The audio controller of claim 18, wherein the volume control circuitry is further configured to fill at least a portion of remaining schedule blocks of the frame with bits unrelated to the received one-bit wide data stream.

20. The audio controller of claim 19, wherein the bits unrelated to the received one-bit wide data stream comprise bits providing offset control for the digital-to-analog converter (DAC).

21. The audio controller of claim 20, further comprising an amplifier coupled to the at least one digital finite impulse response (FIR) filter and configured to drive the transducer to reproduce the sounds in the received one-bit wide audio data stream.

22. The audio controller of claim 17, wherein the at least one digital finite impulse response (FIR) filter comprises at least two digital finite impulse response (FIR) filters configured to operate in parallel from the frame.

* * * * *